United States Patent [19]

Krier et al.

[11] Patent Number: 5,082,244

[45] Date of Patent: Jan. 21, 1992

[54] CARGO AIR BAG INFLATION VALVE AND INFLATOR COMBINATION

[75] Inventors: Martin Krier; Henry L. Liebel, both of Cincinnati, Ohio

[73] Assignee: Shippers Paper Products Company, Loveland, Ohio

[21] Appl. No.: 636,064

[22] Filed: Dec. 28, 1990

[51] Int. Cl.⁵ .............................................. F16L 37/28
[52] U.S. Cl. .................................. 251/149.6; 410/125
[58] Field of Search ............... 251/149.1, 149.3, 149.6; 410/125, 119, 128; 137/223, 226

[56] References Cited

U.S. PATENT DOCUMENTS

| | | | |
|---|---|---|---|
| 2,701,579 | 2/1955 | Hasselquist | 251/319 X |
| 3,104,088 | 9/1963 | Cator | 251/149.6 |
| 3,131,905 | 5/1964 | Nyberg | 251/149.6 |
| 3,177,816 | 4/1965 | Daberkow | 410/125 |
| 3,704,002 | 11/1972 | Skarzynski | 251/149.6 |
| 3,715,099 | 2/1973 | Shendure | 251/149.1 |
| 4,070,003 | 1/1978 | Shames et al. | 251/149.6 |
| 4,073,389 | 2/1978 | Angarola et al. | 137/223 X |
| 4,146,069 | 3/1979 | Angarola et al. | 137/223 X |
| 4,546,956 | 10/1985 | Moberg | 251/149.6 |
| 4,591,519 | 5/1986 | Liebel | 410/125 X |

FOREIGN PATENT DOCUMENTS

| | | | |
|---|---|---|---|
| 615629 | 2/1961 | Canada | 410/119 |
| 867594 | 4/1971 | Canada | 410/119 |

Primary Examiner—Martin P. Schwadron
Assistant Examiner—Kevin L. Lee
Attorney, Agent, or Firm—Wood, Herron & Evans

[57] ABSTRACT

A cargo air bag inflation valve and inflator combination comprising a tubular plastic valve body having a central passageway for the flow of compressed air to permit the inflating of an air bag. Valve closure means is reciprocal in the passageway and is biased to a normal valve closed position. A quick connect/disconnect fitting carries detent balls operative to engage a circumferential edge on the valve body and to snap onto a detent ball receiving surface of diameter less than the circumferential edge to thereby draw the valve body into the fitting. An annular shoulder in the fitting engages the valve plug separating the valve seat carried by the valve body from the valve plug permitting inflation of the air bag through the fitting and central passageway.

10 Claims, 2 Drawing Sheets

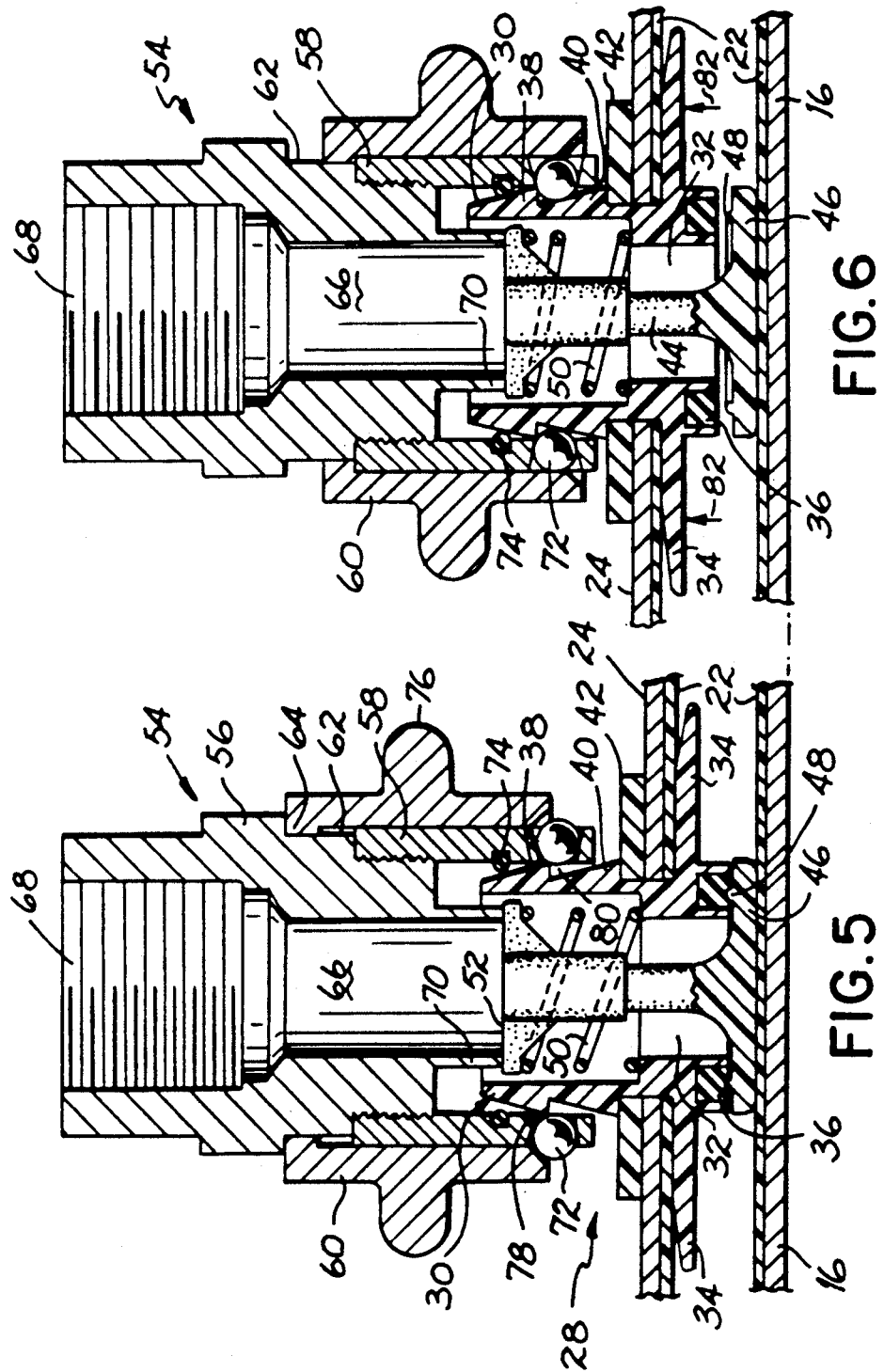

CARGO AIR BAG INFLATION VALVE AND INFLATOR COMBINATION

BACKGROUND OF THE INVENTION

This invention relates to cargo air bags and, more particularly, to an inflation valve and inflator combination for inflating cargo air bags with compressed air.

Cargo air bags are known to the art as a simple, low cost means of bracing railcars, trailers, and overseas containers for securing cargo for shipment. Air bags typically comprise an inflatable bladder which is secured inside a paper bag or envelope. The bags are of such a size that they can be inserted into voids between spaced loads or between the load and the side or end walls of a container such as a railroad car or trailer and then inflated to expand and secure the load against movement during transit. To this end, the air bag is provided with an inflation valve permitting the bag to be inflated in place with gas under pressure, typically compressed air, to a desired inflation pressure at which the bag is expanded to exert an outward pressure to force the load against side or end walls, or against bulkheads, to restrain the load from moving.

One such inflation valve now in use includes a plastic valve having a tubular valve body to which a flange is attached. The flange is welded to a plastic bladder inside the paper bag to form an airtight seal and the valve body extends out of the bag where it can be grasped by a suitable inflation fixture. The valve includes a valve stem mounted in the tubular body movable between a valve open position and a valve closed position sealing the bladder. The valve stem is spring loaded so that it is biased to the valve closed position until contacted by the air inflation device which pushes the valve stem inwardly to open the valve body for flow of compressed air into the bladder. That is, in such an inflation valve, the valve stem is spring loaded in the valve body and includes a closure plate at one end thereof interior of the bladder which seats against a resilient valve seat in the valve closed position. The valve body is adapted to be received in the air inflation fixture which includes an internal element for moving the valve stem against the spring biasing force and thereby moving the closure plate from its sealing position on the resilient valve seat. However, a significant problem often accompanies such an inflation valve design. Cargo air bags are typically flat in the uninflated condition and thereby lend themselves to being lain flat on a trailer or railcar floor or loading dock with the inflation valve body facing upwardly. When the air inflation fixture is placed on the valve body in an attempt to make the connection for inflating the bag, the force exerted by the operator on the fixture presses against the valve stem which causes the closure plate to press against the opposite side of the air bag and in turn against the floor. Thus, the more force that is exerted by the operator to cause the air inflation fixture to mate with the inflation valve, the more force that is exerted against the closure plate causing the closure plate to remain sealed against the seat in the valve closed position. This is directly counter to the desired result of moving the closure plate off of its seated position to open the valve for inflation of the air bag.

SUMMARY OF THE INVENTION

It is among the principal objects of this invention to provide an improved cargo air bag inflation valve and inflator combination for air bags of the type described which has the advantage that when the inflator is placed on the inflation valve body and a force is exerted thereon the valve body is actually drawn into the inflator and moved relatively away from the closure plate. An internal shoulder in the inflator restrains movement of the valve stem and closure plate such that when the valve body is drawn into the inflator, the valve body is moved away from the closure plate thus unseating the closure plate from its sealed position and opening the valve fully for flow of compressed air therethrough. Accordingly, the cargo air bag can be placed flat on the floor and the inflator pressed thereagainst on the valve body since the opening of the air bag does not depend on movement of the valve stem closure plate away from the valve body, but, to the contrary, on movement of the valve body away from the closure plate which is in a direction upward and opposite the restraining force of the floor.

In a presently preferred form of the invention, the inflation valve and inflator combination comprises a tubular valve body including an air flow passageway therethrough which is adapted to be mounted in the wall of an air bag providing a passageway for compressed air to flow between the exterior and interior of the air bag for inflating the air bag, a valve plug mounted in said passageway which carries an annular valve closure plate, and a resilient seat in the end of the valve body interior of the air bag upon which the valve closure plate seats in the valve closed position. The valve body is movable with respect to the valve plug between the valve closed position wherein the closure plate seats on the resilient valve seat to form a fluid seal with the valve body preventing the flow of compressed air through the passageway, and a valve open position wherein the closure plate is spaced from the valve seat to permit the flow of fluid through the passageway and into the air bag. A spring internal of the valve body biases the valve to a normal valve closed position. The outer circumference of the valve body exterior of the air bag includes a frustoconical surface, a detent receiving surface, and a circumferential edge therebetween. A quick connect/disconnect fitting is adapted to be connected at one end to a source of compressed air and at the opposite end to receive the valve body therein. The fitting includes an air flow passageway between the ends, an annulus, a number of detent balls mounted in the annulus and movable therein, a, annular collar slidable on the annulus adapted to engage the balls, and a shoulder radially inward of the annulus adapted to engage the valve plug. The valve body is so dimensioned relative to the quick/disconnect fitting that on receipt of the valve body in one end of the fitting and application of pressure to the annular collar sufficient to overcome the spring biasing force on the valve plug the detent balls are caused to ride up and over the circumferential edge of the valve body and onto the detent receiving surface. The movement of the balls over the circumferential edge draws the valve body into the fitting wherein the valve plug engages the shoulder. This inward movement of the valve body into the fitting displaces the valve body relative to the valve plug to thereby remove the valve plug from its seating engagement with the resilient valve seat to thereby open the passageway in the valve body permitting the flow of compressed air through the fitting, through the valve body passageway, and into the interior of the air bag to cause inflation of the air bag.

The air bag inflation valve and inflator combination is easily operated and has the advantage that the inflator and air valve may be quickly engaged and disengaged merely by hand movement of the inflator collar. The face of the valve closure plate may be pressed firmly against the opposite wall of the air bag and restrained thereby without inhibiting opening of the valve; since, according to the principles of the present invention, in this condition the valve body is caused to be drawn into the fitting and in a direction away from the closure plate thus opening the valve body for inflation of the air bag.

BRIEF DESCRIPTION OF THE DRAWINGS

FIG. 5 is a cross-sectional view of the inflation valve and inflator combination of the present invention in the valve closed position.

FIG. 6 is a cross-sectional view similar to FIG. 5 showing the valve in the valve open position.

DETAILED DESCRIPTION OF THE INVENTION

Figure 1:
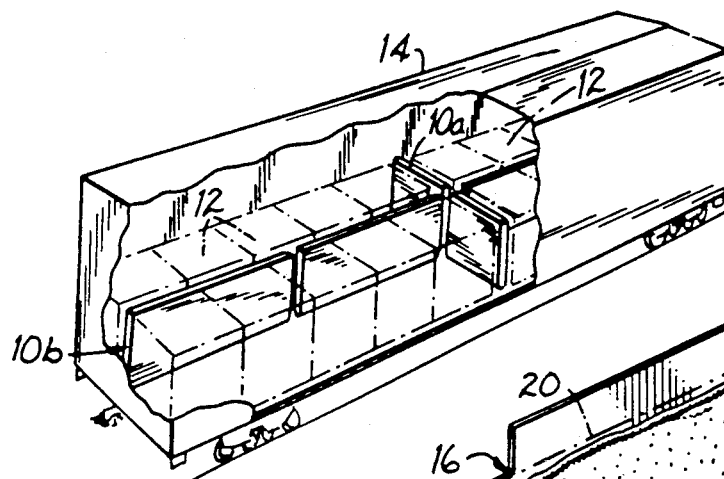
FIG. 1 is a schematic illustration of a railcar with parts broken away showing the environment in which cargo air bags are typically used.

Referring to FIG. 1, cargo air bags 10 keep cargo 12 shipped in containers 14 such as trailers, overseas containers, and railcars tightly braced both laterally and lengthwise to prevent its movement or shifting during transport, a railroad car 14 being illustrated in FIG. 1. For purposes of understanding the environment in which air bags are used, it may be observed that bags 10a provide lengthwise bracing of cargo 12 in a railroad car 14 by compacting and positioning the load toward the end walls thus eliminating lengthwise voids. They also cushion loads upon impact by absorbing shocks. The air bags also enlarge to fill voids that occur when cargo settles.

Bags 10b positioned between lengthwise rows of lading fill the voids in the crosswise direction holding the product firmly against the side walls. The air pressure in the bags exerts constant pressure on the load so that it is constrained against the side walls. The air bags thus prevent side shifting of the load.

Figure 2:
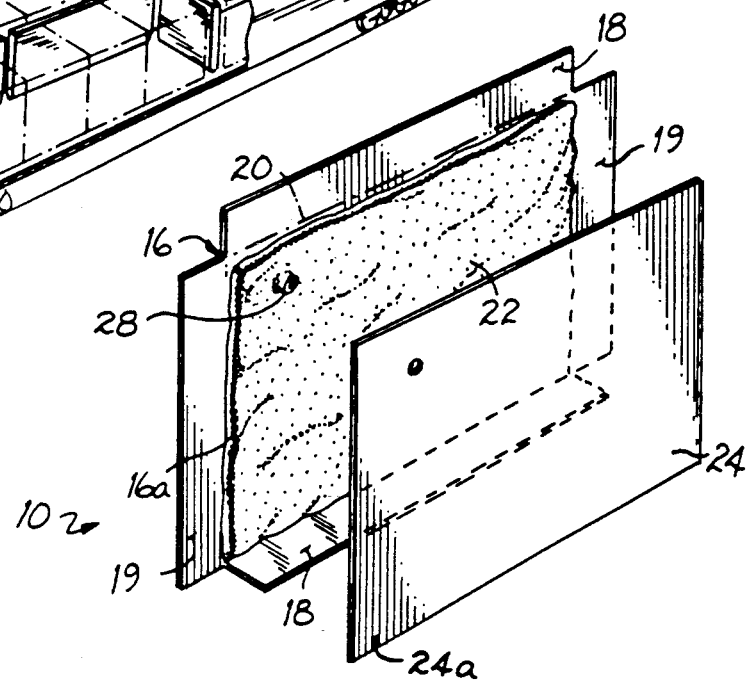
FIG. 2 is an isometric exploded view showing the construction of an air bag.
Figure 3:
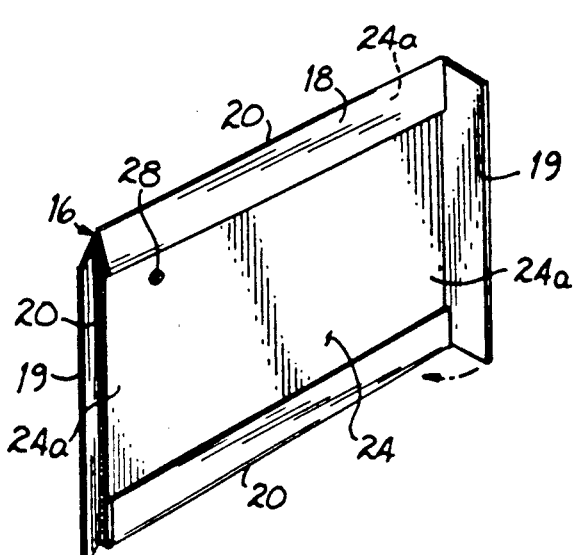
FIG. 3 is an isometric view showing the forming of the air bag shown in FIG. 2.
Figure 4:
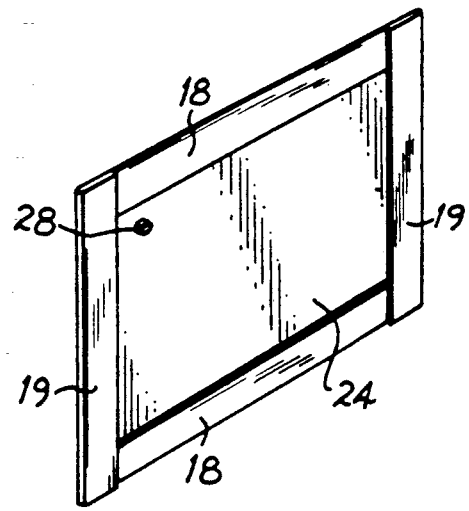
FIG. 4 is an isometric view showing the final configuration of an air bag shown in FIGS. 2 and 3.

For purposes of understanding how air bags are constructed and function, one form of air bag construction will now be described, it being understood that there are a number of different methods of construction of air bags for a number of different applications to which this invention is applicable, the description below being just one example. Referring to FIGS. 2-4, the construction of a heavy duty air bag is shown. In the manufacture of the air bag, a first sheet 16 of paperboard having a lengthwise and widthwise direction includes opposed side 18 and end 19 edges or flaps to be folded inwardly along the lengthwise and widthwise direction, respectively, to form two folded side sections 18 and two folded end sections 19. The fold lines 20 of the side section 18 and end sections 19 define a generally planar center section 16a having a defined length and width. The folded side and end sections 18 and 19, respectively, overlap portions of the center section 16a.

An inflatable plastic bladder 22 is laid on the center section 16a of the first paperboard sheet 16. A second sheet 24 of paperboard having a length and width corresponding generally of the center section 16a of the first sheet 16 is placed on the bladder with marginal side and end portions 24a lying under the overlapping side and end sections 18 and 19 of the first sheet 16. The side and end sections 18 and 19 are glued to the side and end portions 24a of the second paperboard sheet 24 and the two members pressed together. In such a heavy duty air bag, the first and second sheets typically are at least two-ply laminated paperboard, each sheet having a thickness in the range of, e.g., 0.22 to 0.24 inch.

An inflation valve 28 is welded to the plastic bladder 22 and passes through a hole in sheet 24 providing a fixture external of the bag for inflation of the bladder typically with compressed air.

As may be seen with reference to FIG. 4, the air bag 10 thus comprises first 16 and second 24 sheets of paperboard with folded side edges 18 and end edges 19 of the first sheet 16 laminating edge portions 24a of the sheet 24 therebetween with an internal bladder enclosed therein, and the inflation valve 28 extending through the sheet 24 permitting inflation of the plastic bladder with compressed air.

Referring now to FIGS. 5 and 6, the air bag inflation valve 28 includes a tubular valve body 30 which extends through the sheet 24 of the air bag 10. The valve body 30 has a passageway 32 extending therethrough. The valve body 30 further includes an annular flange 34 located inside the plastic bladder 22 which is sealed, e.g., by ultrasonic welding, to the plastic bladder 22 interiorly of the air bag 10 to form a sealed connection therewith.

An annular valve seat 36, which may be formed of an elastomeric seating material, is located at the end of the valve body 30 inside the bladder 22. The valve body 30 extends out of the air bag 10 and includes a first frustoconical shaped section 38 and a second frustoconical shaped section 40 on the outer circumference thereof. A plastic ring 42 inserted between the second frustoconical shaped section 40 and the outside of the paperboard sheet 24 secures the valve body in place by clamping sheet 24 and bladder 22 between it and the flange 34.

The air bag valve 28 further includes a valve stem 44 located in the valve body passageway 32, the valve stem 44 terminates in an annular closure plate 46 interior of the bladder 22. The closure plate 46 includes an annular ridge 48 which seats on the annular seat member 36. An internal spring 50 biases the valve stem 44 to a normally closed position wherein the annular ridge 48 seats in the elastomeric seat 36 to seal the valve 28 closed. The valve stem 44 is movable in the passageway 32 in the valve body 30 by the imposition of a force on its end 52 opposite the closure plate 46. Upon imposition of this force, the spring 50 is compressed by movement of the valve stem 44, and the closure plate 46 is moved away from the valve seat 36 thus opening the valve to the flow of air through the passageway 32 in the valve body 30 to inflate the bladder 22 (see FIG. 6). Upon release of the force on the end 52 of the valve stem 44, the spring 50 expands causing the valve to close (see FIG. 5).

Continuing to refer to FIGS. 5 and 6, an inflator 54 includes a main body portion 56, an annulus 58 threaded on one end of the main body portion 56, and an annular collar 60 surrounding the annulus 58. An annular groove 62 is defined by the main body portion 56 of the inflator 54 and one end of the annulus 58. The collar 60 includes an inwardly directed annular flange 64 which rides in groove 62 permitting the collar 60 to slide axially on the inflator about annulus 58.

The main body portion 56 of the inflator 54 includes a through opening 66. The body 56 is internally threaded at one end 68 of the through opening 66. The opposite end of the through opening 66 terminates in an annular shoulder 70. The inflator 54 is adapted to be threaded onto the end of an air inflation hose (not shown) which communicates with a source of gas under pressure, for example, most commonly compressed air. A hand operated on/off valve may be attached to the air hose and typically includes a lever actuated valve which opens and closes the hose for the passage and shutoff of compressed air. A built-in pressure gauge may also be employed whereby the operator can quickly and easily read the inflation pressure. Heavyweight air bags typically are inflated to a pressure in the range 3 to 8 psi and lightweight air bags are typically inflated to a pressure of 1 to 3 psi. The source of compressed air, for example, an air compressor, is typically operated in the range of 50 to 100 psi.

The inflator 54 further includes a number of detent balls 72 circumferentially equally spaced and mounted in the wall of the annulus 58. The balls although secured in the annulus 58 are free to float radially inwardly and outwardly. That is, when the collar 60 is slid toward the balls 72, the collar 60 engages the ball surfaces and forces the balls 72 radially inwardly into a locking position. When the collar 60 is slid away from the balls 72, the balls 72 become unrestrained and are free to float radially outwardly. For example, six 3/16 inch diameter balls may be used. The flange 64 sliding in groove 62 in combination define the limits of movement of the collar 60 on the annulus 58. The annulus 58 also carries an internal O-ring 74 formed of a suitable elastomeric material. An external annular flange 76 on collar 60 facilitates the operator's sliding movement of the collar 60.

In use, the operator grasps the inflator 54 in his hands with his thumb and fingers extending around the annular flange 76 of the collar 60. The inflator 54 is placed on the tubular valve body 30 with annulus 58 surrounding the valve body 30. In this position, the balls 72 ride up the surface of the first frustoconical shaped portion 38. The end 52 of the valve stem 44 engages the end of the annular shoulder 70. The operator continues to slide the collar 60 down the annulus 58 and against the surface of the balls 72. At this point, the balls 72 are caused to roll up and over the circumferential edge 78 of the larger end of the frustoconical shaped portion 38 and snap into the annular detent surface 80 formed by the second circumferential shaped portion 40 (see FIG. 6).

As the balls 72 ride over edge 78, the tubular valve body is caused thereby to be drawn into the inflator 54 as shown by arrows 82 in FIG. 6. This inward movement of the valve body 30 in the inflator 54 causes shoulder 70 to react against end 52 of the valve stem 44 compressing the spring 50. Movement of the valve stem 44 and compression of the spring 50 in turn causes the valve seat 36 to be moved away from the closure plate 46 thus lifting the valve seat 36 out of engagement with the annular ridge 48 and opening the valve 28 such that compressed air passing through the passageway 66 in the inflator 54 flows through passageway 32 in the valve 28 and radially outwardly at the closure plate 46 to inflate the bladder 22. The O-ring 74 engages the surface of the first frustoconical shaped section 38 to form an airtight seal about the circumference of the tubular valve body 30. In this position, the interaction of the detent balls 72, edge 78, and collar 60 positively lock the inflator 54 on the valve body 30.

When the air bag is inflated to the desired pressure, the flow of compressed air to the inflator 54 is stopped. The operator then grasps the flange 76 of the collar 60 and pulls it back away from the air bag. Spring 50 then expands against the valve stem 44 and the valve stem 44 in turn reacts against shoulder 70 to push the inflator 54 away from the valve 28. On retraction of the collar 60, the balls 72 are once again unrestrained and free to float radially outwardly thereby releasing the inflator 54 from the valve body 30 (see FIG. 5). Once again, the annular ridge 48 on the closure plate 46 seats on the elastomeric valve seat 36 to close the valve 28 thus sealing the air under pressure in the bladder 22 and maintaining the air bag in its inflated condition.

It will be appreciated by comparing the relative position of the air bag sheet 24 with sheet 16 that when the valve is in the valve open position shown in FIG. 6 the valve body 30 has been drawn inwardly into the inflator 54 and away from sheet 16 thus in effect lifting or further separating sheet 24 from sheet 16. Thus, rather than the closure plate moving away from the valve seat, as is typical in the prior art, the valve body 30 carrying the valve seat 36 moves away from the closure plate 46 to open the valve 28. As a consequence, pressure can be placed on the valve stem 44 by the inflator 54 and the closure plate be restrained such as occurs when sheet 16 is lying against the floor of a loading dock or cargo carrier, and the valve 28 will still fully open since the valve body 30 is moved relative to the valve stem and not vice versa. This is in contrast to the prior art wherein the force of the quick/disconnect fitting must physically lift the closure plate from the valve seat. As may be appreciated if the prior art valve closure plate were restrained by an opposing surface, opening of the valve would be difficult, if not impossible.

Thus having described the invention, what is claimed is:

1. A cargo air bag inflation valve and inflator combination comprising:

a tubular valve body having an air passageway therethrough adapted to be mounted in the wall of an air bag providing a passageway for compressed air between the exterior and the interior of said air bag for inflating said air bag, valve closure means, said valve body being movable with respect to said valve closure means between a valve closed position wherein said valve closure means forms a fluid seal with said valve body preventing flow of air through said passageway, and a valve open position wherein said valve closure means permits the flow of air through said passageway, means providing a force biasing said valve closure means to a normal valve closed position, the outer circumference of said valve body exterior of said air bag including a first surface, a detent-receiving surface, and a circumferential edge therebetween, a quick connect/disconnect fitting adapted to be connected at one end to a source of compressed air and at the opposite end to receive said valve body, said fitting including an annulus, detent means mounted in said annulus and movable therein, detent locking means adapted to engage said detent means, and a shoulder radially inward of said annulus adapted to engage said valve closure means, said valve being so dimensioned relative to said fitting that on receipt of said valve body in said opposite end of said fitting and on application of said detent locking means overcoming said biasing force, said detents are caused to ride up and over said circumferential edge of said valve body and onto said detent-receiving surface, the movement of said detent means over said circumferential edge drawing said valve body into said fitting wherein said valve closure means engages said shoulder and displacing said valve body relative to said valve closure means to thereby open said passageway in said valve body permitting the flow of air through said fitting and said valve body passageway to inflate said air bag.

2. The cargo air bag inflation valve and inflator combination of claim 1 wherein said valve closure means comprises a valve plug mounted in said passageway and reciprocal therein, said valve plug carrying at one end interior of said air bag a closure plate.

3. The cargo air bag inflation valve and inflator combination of claim 2 wherein said means providing a force biasing said valve closure means to a normal valve closed position comprises a coil spring mounted in said passageway surrounding said valve plug.

4. The cargo air bag inflation valve and inflator combination of claim 1 wherein said first surface has a frustoconical configuration, its smaller end being disposed at the entrance of the valve body air passageway and its larger end terminating in said circumferential edge.

5. The cargo air bag inflation valve and inflator combination of claim 1 wherein said detent locking means comprises a collar slidable on said annulus and wherein application of pressure to said collar slides said collar into engagement with said detent means to lock said fitting on said tubular valve body.

6. The cargo air bag inflation valve and inflator combination of claim 1 wherein said detent means comprises a plurality of balls mounted in said annulus and generally circumferentially equally spaced therein, said balls being free floating in a radial direction when unrestrained by said detent locking means.

7. A cargo air bag inflation valve and inflator combination comprising:
a tubular valve body having an air passageway therethrough adapted to be mounted in the wall of an air bag providing a passageway for compressed air between the exterior and interior of said air bag for inflating said air bag,
a valve plug mounted in said passageway,
said valve body being movable with respect to said valve plug between a valve closed position wherein said valve plug forms a fluid seal with said valve body preventing flow of air through said passageway, and a valve open position wherein said valve plug permits the flow of air through said passageway,
means providing a force biasing said valve plug to a normal valve closed position,
the outer circumference of said valve body exterior of said air bag including a frustoconical surface, a detent receiving surface, and a circumferential edge therebetween,
a quick connect/disconnect fitting adapted to be connected at one end to a source of compressed air and at the opposite end to receive said valve body, said fitting including an annulus, detent means mounted in said annulus and movable therein, detent locking means slidable on said annulus adapted to engage said detent means and a shoulder radially inward of said annulus adapted to engage said valve plug, said valve being so dimensioned relative to said fitting that on receipt of said valve body in said opposite end of said fitting and on application of pressure to said detent locking means overcoming said biasing force, said detents are caused to ride up and over said circumferential edge of said valve body and onto said detent receiving surface, the movement of said detent means over said circumferential edge drawing said valve body into said fitting wherein said valve plug engages said shoulder and displacing said valve body relative to said valve plug to thereby open said passageway in said valve body permitting the flow of air through said fitting and said valve body passageway to inflate said air bag.

8. The cargo air bag inflation valve and inflator combination of claim 7 wherein said force biasing said valve to a normal valve closed position comprises a coil spring mounted in said passageway engaging said valve plug.

9. A cargo air bag inflation valve and inflator combination comprising
a tubular valve body having an air passageway therethrough adapted to be mounted in the wall of an air bag providing a passageway for compressed air between the exterior and the interior of said air bag for inflating said air bag,
a valve plug mounted in said passageway including valve closure means,
said valve body being movable with respect to said valve plug between a valve closed position wherein said valve closure means forms a fluid seal with said valve body preventing flow of air through said passageway, and a valve open position wherein said valve closure means permits the flow of air through said passageway,
means providing a force biasing said valve closure means to a normal valve closed position,
the outer circumference of said valve body exterior of said air bag including a first frustoconical surface, a second frustoconical surface defining a detent receiving surface, and a circumferential edge therebetween,
a quick connect/disconnect fitting adapted to be connected at one end to a source of compressed air and at the opposite end to receive said valve body, said fitting including an annulus, detent balls mounted in said annulus being generally equally spaced about the circumference of said annulus and being free floating in a radial direction when unrestrained, an annular collar slidable on said annulus adapted to engage said detent balls, and a shoulder radially inward of said annulus adapted to engage said valve plug,
said valve being so dimensioned relative to said fitting that on receipt of said valve body in said opposite end of said fitting and on application of pressure to said collar overcoming said biasing force, said detent balls are caused to ride up said first frustoconical surface and over said circumferential edge of said valve body and onto said detent receiving surface, the movement of said detent balls over said circumferential edge drawing said valve body into said fitting wherein said valve plug engages said shoulder and displacing said valve body relative to said valve closure means to thereby open said passageway in said valve body permitting the flow of air through said fitting and said valve body passageway to inflate said air bag.

10. A cargo air bag inflation valve and inflator combination comprising a tubular valve body having an air passageway therethrough adapted to be mounted in the wall of an air bag providing a passageway for compressed air between the exterior and the interior of said air bag for inflating said air bag, said tubular valve body including an annular flange adapted to be sealed to an inflatable bladder in said air bag, said valve body having a first end exterior of said air bag and a second end interior of said bladder, said air passageway extending between said first and second ends, a valve plug mounted in said passageway and reciprocal therein and including a first end generally adjacent said first end of said valve body and an opposite end, said opposite end comprising an annular closure plate, a resilient annular valve seat at said second end of said valve body, said valve body being movable with respect to said valve plug between a valve closed position wherein said closure plate forms a fluid seal with said valve seat preventing flow of air through said passageway, and a valve open position wherein said closure plate is spaced from said valve seat permitting the flow of air through said passageway, a coil spring mounted in said passageway surrounding said valve plug providing a force biasing said valve plug and closure plate to a normal valve closed position, the outer circumference of said valve body exterior of said air bag including a first frustoconical surface, a second frustoconical surface providing a detent ball receiving surface, and a circumferential edge therebetween, said first frustoconical surface having a smaller end adjacent said first end of said tubular body and its larger end terminating in said circumferential edge, a quick connect/disconnect fitting adapted to be connected at one end to a source of compressed air and at the opposite end to receive said valve body, said fitting including an annulus having an internal diameter slightly larger than the diameter of said circumferential edge whereby said annulus will fit over said valve body, detent balls mounted in said annulus being generally equally circumferentially spaced therein and being free floating in a radial direction when unrestrained, an annular collar slidable on said annulus adapted to engage said detent balls, and an annular shoulder radially inward of said annulus adapted to engage said first end of said valve plug, said valve being so dimensioned relative to said fitting that on receipt of said valve body in said opposite end of said fitting and on application of pressure to said collar overcoming said spring biasing force, said detent balls are caused to ride up said first frustoconical surface and over said circumferential edge of said valve body and onto said detent receiving surface, the movement of said detent balls over said circumferential edge drawing said valve body into said fitting wherein said first end of said valve plug engages said shoulder and said valve body is displaced relative to said valve plug to lift said valve seat from said closure plate to thereby open said passageway in said valve body permitting the flow of air through said fitting and said valve body passageway to inflate said air bag.

* * * * *